UNITED STATES PATENT OFFICE

WERNER SCHULEMANN, OF VOHWINKEL-HAMMERSTEIN, AND AUGUST WINGLER AND FRITZ SCHÖNHÖFER, OF ELBERFELD, GERMANY, ASSIGNORS TO WINTHROP CHEMICAL COMPANY, INC., OF NEW YORK, N. Y.

AMINOALKYL DERIVATIVES OF AMINO-TRIPHENYLMETHANE COMPOUNDS

No Drawing. Application filed August 24, 1925, Serial No. 52,229, and in Germany September 11, 1924.

The present invention relates to exceedingly valuable and specifically effective new remedies for use in therapy. The process consists of their manufacture in the conversion of amino-derivatives of the triarylmethane series, their derivatives, substitution products and equivalents, into more strongly basic amino-derivatives, in which newly introduced nitrogen atoms are combined to the aromatic amino groups through the medium of aliphatic radicals, and which new substances may be represented by the general formula:

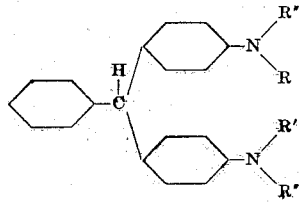

wherein R represents a di-alkyl-amino-ethylene-residue, R' represents one of the substituents, alkyl and dialkyl-amino-ethylene, one R'' stands for an alkyl or acyl group and the other R'' stands for alkyl, and wherein the benzene residues of the triphenyl-methane nuclei may bear a substituent of the group consisting of alkyl and dialkyl-amino groups.

The manufacture of the said more strongly basic amino derivatives can be effected by melting the said amino derivatives of the triarylmethane series with salts of halogenated alkylamines or by adding the amino alkyl radicle in accordance with any customary method, as for example, by the decomposition of the said amino derivatives of the triarylmethane series with halogenated alkyl amines or their substitution products, such as bromoethyl phthalimide, and subsequently splitting off the phthalic acid. Naturally the process can also be applied in the manner according to which the said amino alkyl residues are successively united to the said amino derivatives of the triarylmethane series, their derivatives, substitution products and equivalents, as for example, by first acting on the amino derivatives of the triarylmethane series, their derivatives, substitution products and equivalents with ethylene oxide or halogenated alcohols and converting the hydroxyalkylamino derivatives, thus produced into the said more strongly basic amino derivatives by means of the halogenated derivatives in the customary manner. The process can likewise be applied by decomposing reactive derivatives of the triarylmethane series, their derivatives, substitution products and equivalents with aliphatic diamines. It will be understood that yet another method of execution of the present invention consists in the conversion of intermediate products suitable for the manufacture of the above mentioned amino derivatives of the triarylmethane series, their derivatives, substitution products and equivalents into more strongly basic amino-derivatives of said intermediate products according to any of the methods outlined above, or according to any other customary method, subsequently transforming the more strongly basic amino derivatives of the intermediate products thus obtained into the said polyamino derivatives. Both primary and secondary amino derivatives of the triarylmethane series, their derivatives, substitution products and equivalents can be converted into the said more strongly basic amino derivatives. Moreover, it is also possible to use amines which contain not only one but several amnio-groups and likewise the side-chain carrying the aliphatic nitrogen, whether occurring only once or several times, may be either straight or branched and the aliphatic nitrogen atom may happen to be in the β- or γ-position or even further removed from the amino groups.

*Example 1*

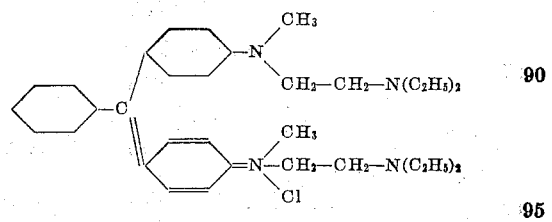

31 parts by weight of methyl-diethyl amino ethylaniline are heated with constant stirring for about 24 hours at 105–110° C. with 13.5 parts by weight of dehydrated oxalic acid and 8 parts by weight of benzaldehyde with the addition of 15 parts by weight of water. To the reaction product is added the calculated quantity of sodium carbonate and any unchanged amine and benzaldehyde are eliminated by steam distillation. The leucocompound, which remains behind as a viscous oil, is converted into the dyestuff by boiling for several hours in acetic acid solution with chlor-anil or any customary oxidizing agent, such for example as lead peroxide. The dystuff produced is isolated as the zinc chloride double salt and purified. When freed from zinc it is a lustrous bronze powder, easily soluble in water and of a bluish-green shade.

*Example 2*

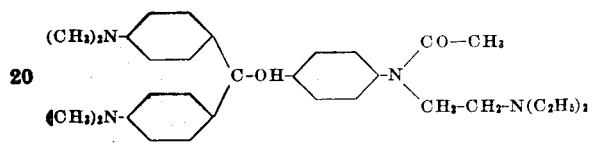

13 parts by weight of tetra methyl-diamino benzhydrol are dissolved in 20 parts by weight of 20 per cent hydrochloric acid while cooling with ice, added to a solution of 11.7 parts by weight of diethyl amino ethylacetylaniline in 36 parts by weight of 10 per cent hydrochloric acid and the mixed solutions are immediately heated on a water bath of 40–50° C. for about 1½ days with constant stirring.

When the hydrol has disappeared, the free base is liberated by the addition of a 50 per cent sodium acetate solution, while cooling, appearing at first as a resin like magma, whereupon it is converted into the hydrochloride by means of ethereal hydrochloric acid. The product is a yellowish grey crystalline powder melting with decomposition at 120–125° C. This base is dissolved in an excess of 33 per cent acetic acid and heated under reflux for 6–8 hours with twice the theoretically calculated quantity of chloranil.

The intensely blue solution of the dystuff is filtered and the dye-base is precipitated after the addition of ice by means of a 20 per cent caustic soda solution.

The dye-base is a reddish-brown powder, easily soluble in dilute acetic acid. It swells up and melts at about 135–138° C.

*Example 3*

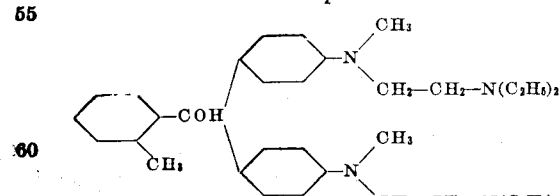

11 parts by weight of ortho-toluic acid are mixed with 18 parts by weight of phosphorous oxychloride, 125 parts by weight of diethyl amino ethyl-methyl aniline are then added and after cooling 20 parts by weight of dehydrated zinc chloride are slowly entered with vigorous stirring. After the temperature has ceased to rise the mass is heated for a further 6–8 hours on a boiling water bath.

The contents of the reaction vessel are boiled out with water, precipitated with sodium carbonate and the residue dissolved in dilute hydrochloric acid. Finally the dye-base is separated with caustic soda solution and dissolved in ether. The dried ether solution is evaporated, the remaining residue is dissolved in absolute alcohol and rendered congo acid by means of 20 per cent hydrochloric acid.

After evaporating in vacuo yellowish-red hygroscopic crystal leaves are left, possessing metallic lustre.

We claim:—

1. As new products, aminoalkyl derivatives of amino-triphenylmethane compounds, said products having the general formula:

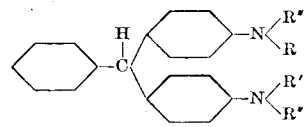

wherein R represents a di-alkyl-amino-ethylene residue, R' represents one of the substituents alkyl and di-alkyl-amino-ethylene, one R'' stands for an alkyl or an acyl group and the other R'' stands for an alkyl, and wherein the benzene residues of the triphenyl-methane nuclei may bear a substituent of the group consisting of alkyl and dialkyl-amino groups.

2. As a new product, the compound having the formula:

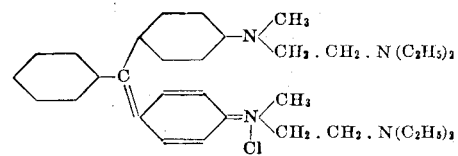

which product when purified and in dry powdered form is a lustrous bronze powder, easily dissolving in water to the production of a bluish-green solution.

In testimony whereof we have hereunto set our hands.

WERNER SCHULEMANN.
AUGUST WINGLER.
FRITZ SCHÖNHÖFER.